(12) United States Patent
Joslyn et al.

(10) Patent No.: US 7,686,719 B2
(45) Date of Patent: Mar. 30, 2010

(54) TENSIONER WITH DRAINHOLE

(75) Inventors: Robert C. Joslyn, Christian County, MO (US); Stephen G. Webb, Springfield, MO (US)

(73) Assignee: Dayco Products, LLC, Tulsa, OK (US)

( * ) Notice: Subject to any disclaimer, the term of this patent is extended or adjusted under 35 U.S.C. 154(b) by 152 days.

(21) Appl. No.: 10/962,296

(22) Filed: Oct. 7, 2004

(65) Prior Publication Data
US 2006/0079359 A1    Apr. 13, 2006

(51) Int. Cl.
*F16H 7/08* (2006.01)
(52) U.S. Cl. ........................ 474/117; 474/135
(58) Field of Classification Search ............... 474/144, 474/90, 101, 117, 133, 134, 138, 109
See application file for complete search history.

(56) References Cited

U.S. PATENT DOCUMENTS

| | | | | |
|---|---|---|---|---|
| 4,502,956 A | * | 3/1985 | Wilson et al. ............... | 210/248 |
| 5,071,316 A | * | 12/1991 | Diem et al. ............... | 415/168.1 |
| 5,113,818 A | * | 5/1992 | Bonde et al. ............ | 123/196 W |
| 5,580,325 A | * | 12/1996 | Hirota et al. ................. | 474/144 |
| 6,004,235 A | * | 12/1999 | Ohta et al. .................. | 474/109 |
| 6,530,245 B1 | * | 3/2003 | Kawabata et al. .............. | 68/20 |
| 2005/0028567 A1 | * | 2/2005 | Kim et al. ...................... | 68/140 |

FOREIGN PATENT DOCUMENTS

JP    01145461 A  *  6/1989

* cited by examiner

*Primary Examiner*—Richard W Ridley
*Assistant Examiner*—Terence Boes
(74) *Attorney, Agent, or Firm*—Thompson Hine LLP

(57) ABSTRACT

A belt tensioner is provided for mounting on a mounting surface of a structure. The tensioner comprises a body, which defines a cavity, and a drain hole that is in communication with the cavity. The drain hole is located on the body so as to be facing the mounting surface of the structure when the tensioner is mounted on the structure. In this manner it is more difficult for contaminants to enter the body than to exit the body.

10 Claims, 4 Drawing Sheets

TENSIONER WITH DRAINHOLE

TECHNICAL FIELD

The present invention relates generally to a belt tensioner, and more specifically, to a belt tensioner having a drain hole to reduce contaminants within the tensioner.

BACKGROUND

Automatic belt tensioning devices are frequently subjected to harsh operating environments that include contaminants such as mud, salt, dust, water, etc. At times the contaminants can be forced into the tensioner with power-washing or some other concentrated spray. At other times contaminants may enter the tensioner as a result of immersion. Even during normal operating conditions, however, contaminants may work their way into the tensioner. Contaminants that become trapped in a tensioner, especially contaminants suspended in a liquid solution such as mud, may increase the potential for wear, corrosion, spring break, high damping and/or lockup.

Previous attempts have been made to open up the tensioner body to allow contaminants both in and out of the tensioner. However, many of these attempts have resulted in increases in wear, spring break, high damping and/or lockup. Additionally, many of these prior art designs do not provide for additional spring bushing area, additional casting strength, etc.

Another approach is to better protect the tensioner body through improved sealing. Known sealing techniques have done a good job of precluding large contaminants. The task now, however, is to also provide an effective way to prevent the entrance of, and at the same time permit the exit of, smaller contaminants. Attempts have been made to place drains in the outwardly facing lateral sides of the tensioner spring case. The problem, however, is that these drains also permit contaminants back into the tensioner through the same hole.

Accordingly, an improved tensioner design is desired that provides effective drainage without compromising the likelihood of contaminant entry.

SUMMARY

According to a first aspect, a belt tensioner is provided for mounting on a mounting surface of a structure. The tensioner according to this aspect comprises a body, which defines a cavity, and a drain hole that is in communication with the cavity. The drain hole is further located on the body so as to be facing the mounting surface of the structure when the tensioner is mounted on the structure.

According to a second aspect, a belt tensioner is provided that comprises a body having a mounting face and a drain hole located in the mounting face.

According to a third aspect, a method for reducing contaminants within a belt tensioner is provided. In one step of the method a tensioner is provided that includes a body defining a cavity and a drain hole in communication with the cavity. In another step the tensioner is mounted to a mounting surface of a structure such that the drain hole faces the mounting surface.

According to a forth aspect, a method of installing a belt tensioner on a mounting surface of a structure is provided. In one step of the method, a tensioner is provided that includes a body, which defines a cavity and which possesses an external mounting face. In another step a drain hole that communicates with the cavity is created in a bottom portion of the mounting face when the tensioner is oriented as it will be once installed on the mounting surface. In yet another step, the tensioner is mounted on the mounting surface such that the mounting face faces the mounting surface.

According to a fifth aspect, another method of installing a belt tensioner on a mounting surface of a structure is provided. In one step of the method a tensioner is provided that includes a body and a plurality of drain holes. The body defines a cavity and possesses an external mounting face. The plurality of drain holes, which are in communication with the cavity, are located on and are dispersed about the mounting face. In another step at least one drain hole that is located on a top portion of the mounting face when the tensioner is oriented as it will be once installed on the mounting surface is sealed. In yet another step, the tensioner is mounted on the mounting surface such that the mounting face faces the mounting surface and such that at least one drain hole is positioned in a bottom portion of the mounting face.

DETAILED DESCRIPTION

Figure 1:
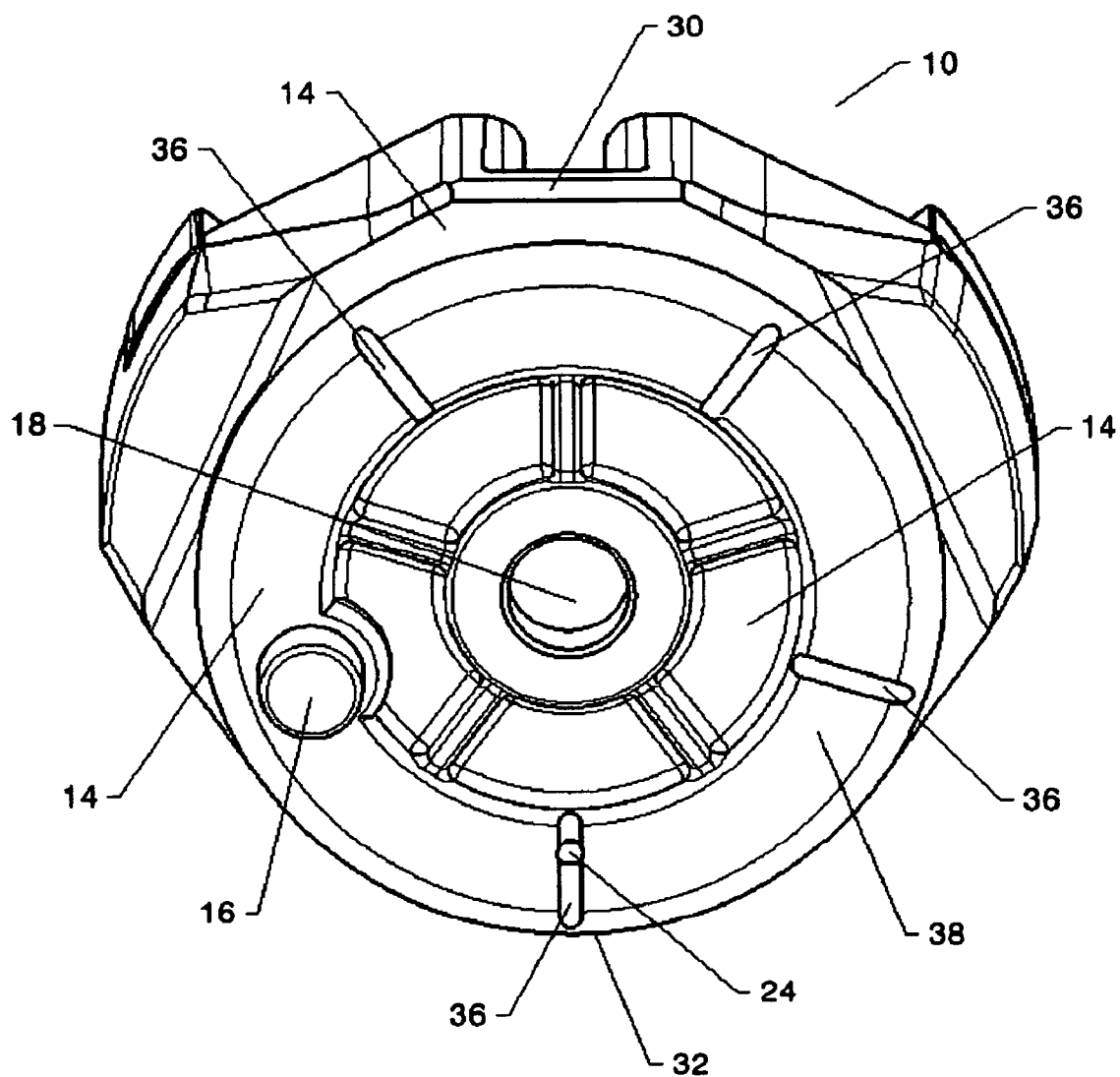
FIG. 1 is a perspective view of a tensioner body according to a first embodiment.
Figure 2:
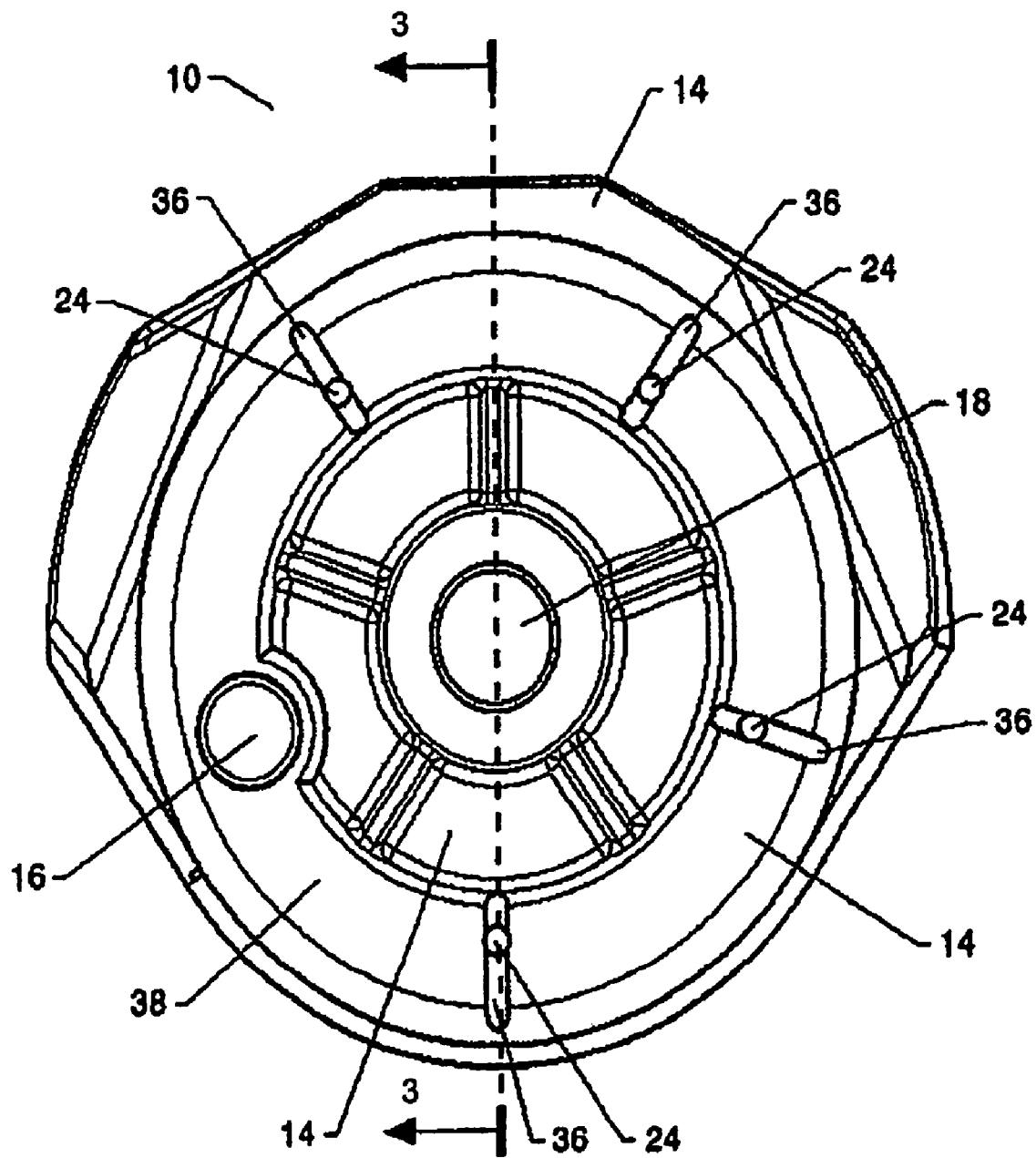
FIG. 2 is a front view of a tensioner body according to a second embodiment.
Figure 3:
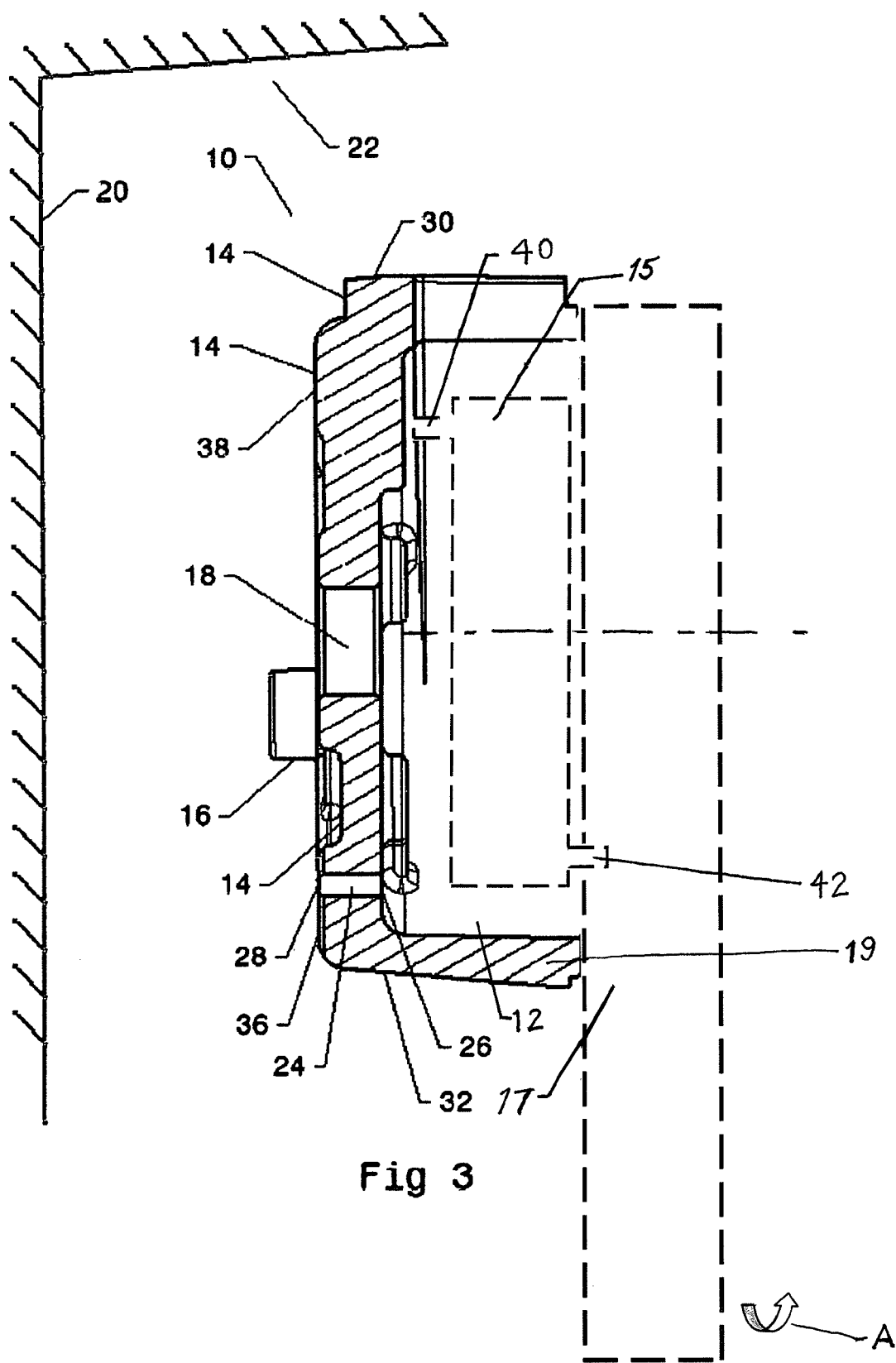
FIG. 3 is a section view of the tensioner body of FIG. 2 along line 3-3.

FIGS. 1-3 depict the body 10 of a pivoting belt tensioner. The tensioner arm 17 and pulley (not shown) are pivotably attached to the body 10. The body 10 defines an internal cavity 12, as best seen in FIG. 3, and includes an external mounting face 14, a peripheral generally annular wall 19, a positioning pin 16 and an aperture 18. The cavity 12 typically houses a spiral or helical spring 15 that is attached at one end 40 to the body and at the other end 42 to the tensioner arm 17 so as to bias the arm 17 to pivot in a direction to tension a belt (A). For this reason, the body 10 may also be referred to as a spring case.

Figure 4:
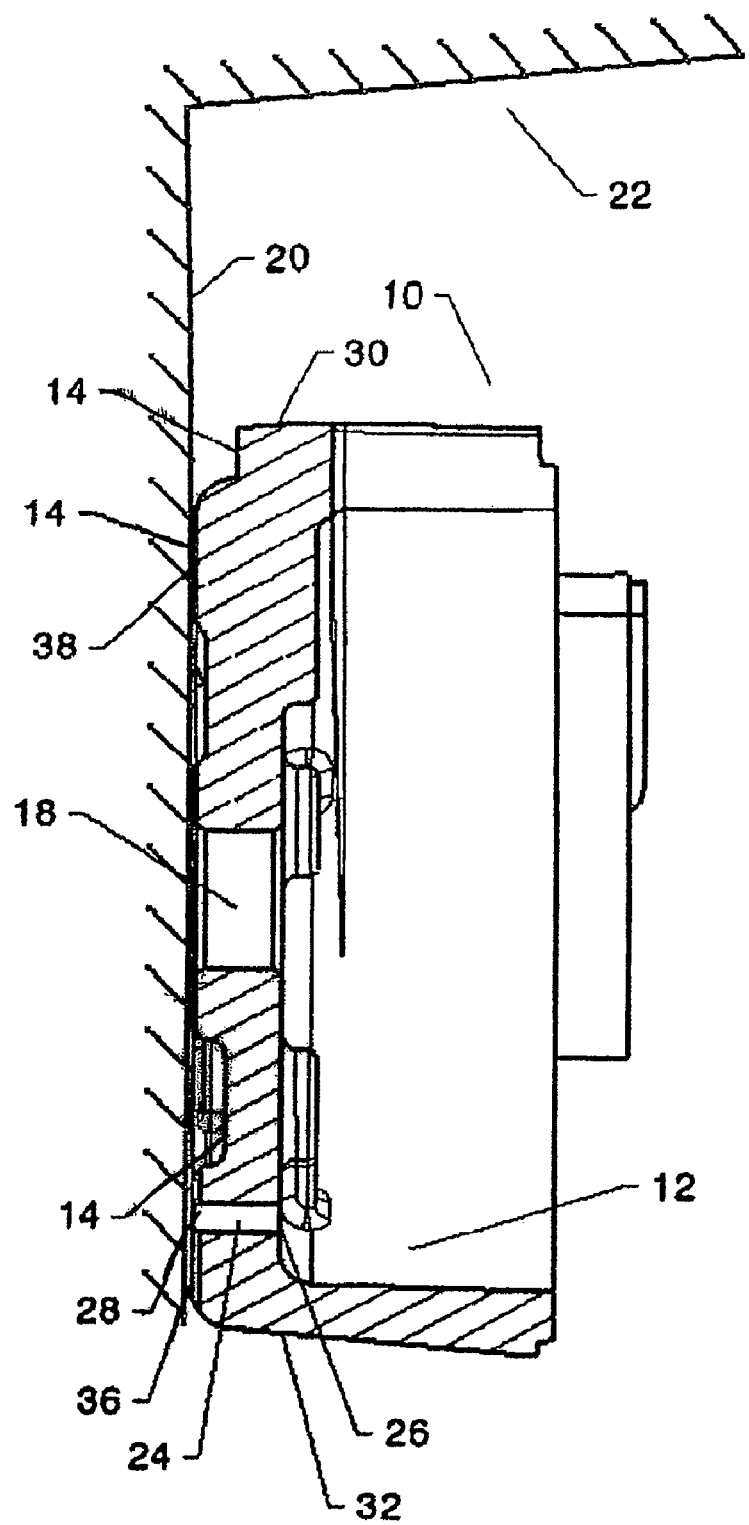
FIG. 4 is a sectional view of the tensioner body mounted to a mounting surface of a structure.

The mounting face 14 of the body refers to that portion of the body 10 that faces a mounting surface 20 of a structure 22 on which the tensioner is mounted. The structure 22 may be a frame of a vehicle, an engine component, like a front cover, or any other element that remains stationary relative to the path of the belt to be tensioned. Because the structure 22 may be substantially larger than the tensioner and may in fact completely surround the tensioner when installed, the mounting surface 20 is defined as the surface of the structure 22 to which the tensioner is actually attached or on which it is actually mounted, as illustrated in FIG. 4. Proper positioning of the tensioner on the mounting surface 20 may be accomplished with the positioning pin 16, which may be received in a corresponding positioning aperture on the mounting surface 20. Aperture 18 is used in conjunction with, for example, a retaining bolt to rigidly attach or mount the tensioner on the structure 22. Typically, at least a portion of the mounting face 14 will directly abut or contact the mounting surface of the structure 22. The mounting face 14, however, also includes those portions of the body 10 that face but do not contact the mounting surface 20.

Still referring to FIGS. 1-3, the body 10 further includes at least one drain hole 24 located on the mounting face 14. Each drain hole, as best seen in FIG. 3, communicates with the cavity 12 and comprises a entrance 26 that is adjacent to the cavity 12 and an exit 28 that is adjacent to the mounting face 14. By locating the drain hole 24 on the mounting face 14 the drain hole 24 is positioned between the body 10 and the mounting surface 20 so as to be protected when the tensioner has been installed. Specifically, the drain hole 24 is thus covered, but not closed, as with an umbrella, by the mounting surface 20. Accordingly, in comparison to a drain hole located on another face of the tensioner, the drain hole 24 located on the mounting face 14 is less likely to be directly subjected to contaminants. The drain hole 24 may be cast with the body 10 or may be machined, for example, by an installer into the body.

When mounted on the structure 22, the mounting face 14 of the body 10 will possess a top portion 30 and a bottom portion 32. As generally understood, the bottom portion 32 is that portion to which contaminants will flow or float, as a result of gravity, during normal conditions. According to one embodiment, the drain hole 24 should be located in the bottom portion 32 of the mounting face 14 to maximize the opportunity for contaminants to flow out of the body.

In another embodiment, the mounting face 14 includes at least one groove 36 that is in communication with the drain hole 24. The groove 36 in cooperation with the drain hole 24 creates a tortuous, turning path to reduce the entrance of contaminants into the body through the drain hole. For example, as depicted in FIGS. 1-3, the drain hole 24 may be located on an abutting surface 38 on the mounting face 14 that is designed to rest flush against the mounting surface 20 when the tensioner is installed. A groove 36 traverses the abutting surface 38 and intersects the drain hole 24. Accordingly, when installed, the only means by which the drain hole 24 may communicate with the environment is through the groove 36. It is anticipated that the profile of the groove 36, including its depth and width, as well as the angle of the groove relative to the drain hole or relative to ground could be optimized for any anticipated contaminant environment.

In yet another embodiment, the body includes a plurality of drain holes 24 that are dispersed around the mounting face 14 so that regardless of what orientation the body 10 is mounted in, at least one drain hole 24 will be located in a bottom portion 32 of the mounting face 14 as desired. Alternatively, or in addition, the body 10 may include a plurality of grooves 36 that are dispersed around the mounting face 14 and oriented radially so that regardless of what orientation the body 10 is mounted in, a drain hole 24 can be created, for example, by an installer, that communicates with a groove 36 located in a bottom portion 32 of the mounting face 14.

In still another embodiment, the profile and path of the drain hole may be altered to provide greater resistance to the entrance of contaminants into the body than to the exit of contaminants. For example, the entrance 26 of the drain hole 24 may be located higher than the exit 28 so that external contaminants must travel uphill to reach the cavity 12. Similarly, the cross-sectional profile of the drain hole between the entrance 26 and the exit 28 can be varied or tapered to take advantage of the surface tension of liquids.

According to another aspect of the invention, a method is provided for reducing contaminants within a belt tensioner. In one step a tensioner is provided that includes a body defining a cavity and a drain hole in communication with the cavity. In another step the tensioner is mounted to a mounting surface of a structure such that the drain hole faces the mounting surface. As previously described, in this manner contaminants within the tensioner body are free to exit the drain hole, but external contaminants are, at least partially, blocked from entering the drain hole.

According to another aspect, a method of installing a belt tensioner on a mounting surface of a structure is provided. According to this aspect, the tensioner is provided to an installer without a drain hole. After orienting the tensioner properly for installation, the installer may then create, for example by drilling, one or more drain holes in the bottom portion of the mounting face. In another step the installer may mount the tensioner on the structure. In this manner, tensioners according to the invention may be manufactured and provided generically with the expectation that the tensioners may be oriented differently in different vehicles.

According to still another aspect, another method of installing a belt tensioner on a mounting surface of a structure is provided. According to this aspect, a tensioner is provided to an installer that includes a body and a plurality of drain holes. The body defines a cavity and possesses an external mounting face. The plurality of drain holes, which are in communication with the cavity, are located on and are dispersed about the mounting face. The installer, after orienting the tensioner for installation may seal at least one drain hole that is located on a top portion of the mounting face. In another step, the installer may mount the tensioner on the mounting surface such that the mounting face faces the mounting surface and such that at least one drain hole is positioned in a bottom portion of the mounting face. In this manner, tensioners according to the invention may be provided generically with more holes than needed. Unnecessary holes can then be sealed by an installer depending on the particular orientation of the tensioner.

Although the body of a pivoting belt tensioner is shown in FIGS. 1-3, the present invention is also applicable to other types of tensioners, including linear tensioners.

What is claimed is:

1. A belt tensioner comprising:
   a spring case body for mounting the belt tensioner on a mounting surface of a structure, the spring case body defining a cavity, wherein the spring case body comprises a mounting face that defines the bottom of the cavity and a peripheral generally annular wall extending from the mounting face;
   a spring housed within the spring case body; and
   a tensioner arm coupled to the spring, wherein the spring biases the tensioner arm in a direction to tension a belt;
   wherein the spring case body further comprises a drain hole in communication with the cavity, the drain hole comprising an exit that is disposed in an external surface of the mounting face, wherein the periphery of the exit is defined only by the mounting face, wherein the spring case body includes a groove recessed into the external surface of the mounting face and wherein the groove is in fluid communication with the exit of the drain hole.

2. The belt tensioner as claimed in claim 1, wherein the drain hole is located on the spring case body so as to be positioned at the mounting face and between the cavity and the mounting surface when the spring case is mounted on the mounting surface.

3. The belt tensioner as claimed in claim 1, wherein the drain hole is located on the spring case body so as to be covered, but not closed, by the mounting surface when the spring case is mounted on the mounting surface.

4. The belt tensioner as claimed in claim 1, wherein the drain hole is located on the spring case body so as to be positioned in a bottom portion of the body when the spring case is mounted on the mounting surface in a pre-selected position.

5. The belt tensioner as claimed in claim 1, further comprising a plurality of drain holes located on the spring case body so as to be facing the mounting surface when the spring case is mounted on the mounting surface.

6. A belt tensioner, comprising:
a spring case body having a mounting face and a peripheral generally annular wall extending from the mounting face;
a spring housed within the spring case body;
a tensioner arm coupled to the spring, wherein the spring biases the tensioner arm in a direction to tension a belt; and
a drain hole located only on the mounting face of the spring case body, wherein the periphery of the drain hole is defined only by the mounting face, wherein the mounting face includes a groove recessed therein that is in fluid communication with the drain hole.

7. The belt tensioner as claimed in claim 6, wherein the spring case body defines a cavity and wherein the drain hole is in communication with the cavity.

8. The belt tensioner as claimed in claim 7, wherein the drain hole comprises an entrance adjacent to the cavity and an exit adjacent to the mounting face of the spring case body and wherein the entrance and the exit are located such that the entrance will be higher than the exit when the spring case is mounted on a mounting surface of a structure in a predetermined position.

9. The belt tensioner as claimed in claim 7, wherein the drain hole comprises an entrance adjacent to the cavity and an exit adjacent to the mounting face of the spring case body and wherein a cross-sectional profile of the drain hole between the entrance and the exit is non-uniform.

10. The belt tensioner as claimed in claim 6, further comprising a plurality of drain holes located on the mounting face.

* * * * *